United States Patent [19]

Verdier

[11] 4,186,789
[45] Feb. 5, 1980

[54] HEAVY-DUTY RADIAL TIRE WITH PLY OF OBLIQUE ELASTIC CORDS RADIALLY INWARD OF THE CARCASS

[75] Inventor: Henri Verdier, Beauregard-L'Eveque, France

[73] Assignee: Compagnie Generale des Etablissements Michelin, France

[21] Appl. No.: 798,372

[22] Filed: May 19, 1977

Related U.S. Application Data

[63] Continuation-in-part of Ser. No. 598,689, Jul. 24, 1975, abandoned.

[30] Foreign Application Priority Data

Jul. 25, 1974 [FR] France .................. 74 25988

[51] Int. Cl.² .......................... B60C 9/20; B60C 9/10
[52] U.S. Cl. ........................... 152/354 R; 152/361 R
[58] Field of Search ....... 152/354 R, 361 R, 361 DM, 152/DIG. 19

[56] References Cited

U.S. PATENT DOCUMENTS

| 3,554,261 | 1/1971 | Mirtain et al. | 152/361 FP |
| 3,735,790 | 5/1973 | Bertrand | 152/361 R |
| 3,789,900 | 2/1974 | Verdier | 152/361 R X |

FOREIGN PATENT DOCUMENTS

| 1025285 | 2/1958 | Fed. Rep. of Germany | 152/361 R |
| 1203076 | 1/1960 | France | 152/361 R |

Primary Examiner—Randolph A. Reese
Attorney, Agent, or Firm—Brumbaugh, Graves, Donohue & Raymond

[57] ABSTRACT

A heavy-duty pneumatic tire having a continuous radial carcass extending from one bead to the other and a tread reinforcement of slightly curved meridian profile restraining the carcass on the outer side thereof is characterized by at least one ply of oblique elastic cords which form an angle of at most 30° with the radial cords of the carcass. This ply is arranged radially inward of the carcass, extends in the transverse direction of the tire over a width greater than the maximum width of the tread reinforcement, and has its two edges located beyond the edges of the tread reinforcement.

8 Claims, 11 Drawing Figures

HEAVY-DUTY RADIAL TIRE WITH PLY OF OBLIQUE ELASTIC CORDS RADIALLY INWARD OF THE CARCASS

CROSS REFERENCE TO RELATED APPLICATION

This is a continuation-in-part of my copending application Ser. No. 598,689, filed July 24, 1975, for "Pneumatic Tire with Ply Radially Inward of the Carcass", now abandoned.

BACKGROUND OF THE INVENTION

This invention relates to very-large, heavy-duty, radial pneumatic tires and, more particularly, to a novel and highly-effective pneumatic tire of that kind having a special reinforcement.

U.S. Pat. No. 3,789,900 discloses a very-large, heavy-duty tire for construction equipment having a carcass reinforcement substantially formed of radial cords or cables and, radially outward of the carcass reinforcement, a crown or tread reinforcement which comprises at least two superimposed plies of cords or cables that are parallel in each ply but crossed from one ply to the other. The tread reinforcement is narrower than the tread, has a slightly curved meridian profile, and restrains the carcass reinforcement on the radially outer side. Under the effect of this restraint, the carcass reinforcement, in the region covered by the tread reinforcement, assumes a meridian profile which is less curved than the normal equilibrium profile while in the region of the shoulders of the tire it assumes a meridian profile which is more curved than the normal equilibrium profile.

Under the action of the inflation pressure, the carcass reinforcement, because of the radial orientation of its cords or cables, tends to assume a pronounced meridian curvature. The tread reinforcement, under the same conditions, tends, as a result of the relatively longitudinal orientation of its cords (at most 30° with respect to the longitudinal direction of the tread), to assume a meridian curvature which is definitely less than that of the carcass reinforcement.

The patent mentioned above discloses, radially on the inside of the carcass reinforcement, in each of the two zones of the shoulders where the crown reinforcement imposes a strong curvature on the carcass reinforcement, at least one auxiliary ply of elastic cords or cables inclined by at most 30° with respect to the cords or cables of the carcass reinforcement.

Such an arrangement attenuates the restraining force exerted by the crown reinforcement while maintaining, within the region of the shoulders, the pronounced curvature of the carcass reinforcement caused by the placing under tension of the cords or cables arranged radially inward of the carcass reinforcement.

U.S. Pat. No. 2,930,425 discloses a tire having a carcass reinforcement including at least two radial cord plies extending from bead to bead and a tread reinforcement formed by at least one ply of conventional cords oriented at an angle of 90° with respect to the radial direction and disposed radially inside the tread, and by at least two conventional plies formed of cords oriented at angles between 20° and 60° with respect to the radial direction, the last-named plies being disposed between or radially inside the carcass reinforcement plies and having an axial width that is greater than the width of the tread.

The object of this structure is to reduce tread wear by separating both functionally and structurally the tread-reinforcing plies provided to reduce the longitudinal and the transverse creeping of the tread on the road.

SUMMARY OF THE INVENTION

An object of the invention is to make a further advance in the state of the art of tires for very-large construction equipment and other heavy-duty vehicles and, in particular, to attenuate further the curvature, slight though it may be, of the portion of the radial carcass reinforcement extending between the auxiliary shoulder plies arranged in the manner described above.

Under the combined effects of the restraint by the tread reinforcement and of the lifting of the shoulders by the auxiliary ply of elastic cords or cables, the carcass reinforcement of conventional heavy-duty tires is subjected, during the very hard service of such tires, to considerable compression strains that may induce cable ruptures, especially when the carcass reinforcement comprises in the tread zone a single ply of radial cords or cables extending from bead to bead.

The present invention remedies this problem by providing at least one ply of oblique elastic cords or cables which form an angle of at most 30° with the radial cords or cables of the carcass. The ply of oblique elastic cords is arranged radially inward of the carcass, extends in the transverse direction of the tire over a width greater than the maximum width of the crown or tread reinforcement, and has its two edges located beyond the edges of the tread reinforcement.

The cords or cables of the continuous ply in accordance with the present invention tend, because of their oblique orientation, to assume a meridian curvature less than that of the carcass in the equatorial zone of the tire when the tire is inflated. This results in a complementary attenuation of the restraining force of the crown reinforcement. Thus, the tension of the cords or cables of the continuous ply in accordance with the present invention decreases the curvature of the carcass reinforcement in the equatorial zone of the tire and increases this curvature in the region of the shoulders.

Furthermore, it is easier in manufacturing a tire to position a continuous ply and possibly superimpose another ply on it than to position two separate plies and possibly superimpose two others on them.

In a preferred embodiment the oblique orientation of the elastic cords or cables of the continuous ply in accordance with the invention is between 6° and 12° with respect to the radial direction.

BRIEF DESCRIPTION OF THE DRAWING

A better understanding of the invention may be gained from a consideration of the following detailed description of the preferred embodiments thereof in conjunction with the appended figures of the drawing, wherein.

DESCRIPTION OF THE PREFERRED EMBODIMENTS

Figure 1:
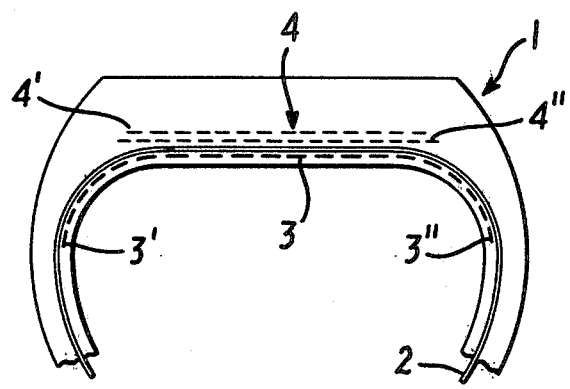
FIGS. 1 to 4 are schematic views in cross section, in a plane passing through the axis of rotation, of the portion of the pneumatic tires with which the invention is concerned.
Figure 5:
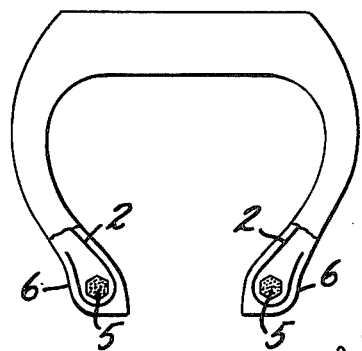
FIG. 5 is a schematic view similar to FIGS. 1 to 4 and showing generally the radially-inner portion of the tires of FIGS. 1 to 4.
Figure 6:
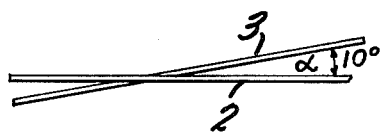
FIGS. 6, 6A, 7, 7A, 8 and 8A are schematic developed plan views of the several reinforcements of a number of embodiments of tires constructed in accordance with the invention.
Figure 6A:
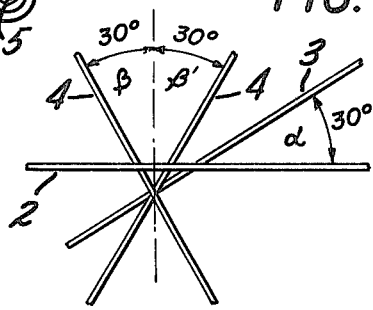

FIG. 1 shows the crown 1 of a tire comprising a carcass ply 2 composed of radial cords or cables preferably made of a metal such as steel. The ply 2 is anchored around bead rings 5 (FIG. 5) arranged in the beads 6 of the tire. The particular structure of the beads 6 and bead rings 5, and the method of anchoring the ply 2 around the bead rings 5, are not critical for purposes of the present invention. Radially outward of the ply 2 there is a so-called crown or tread reinforcement 4 composed of plies of cords or cables preferably made of a metal such as steel. The cords of the reinforcement 4 are oppositely inclined with respect to the longitudinal or circumferential direction of the tire (represented by the broken line) by angles $\beta$ and $\beta'$ of at most 30° (FIG. 6A).

In accordance with the invention, the carcass ply 2 is reinforced by a ply of oblique elastic cords 3 whose edges 3' and 3" are located beyond the edges 4' and 4" of the tread reinforcement 4. The cords of the ply 3 are for example metallic and form an angle $\alpha$ of between 6° and 12°—for example of about 10° (FIG. 6)—with the cords of the ply 2. In accordance with the invention, the angle $\alpha$ is at most 30°, as FIG. 6A shows.

Figure 2:
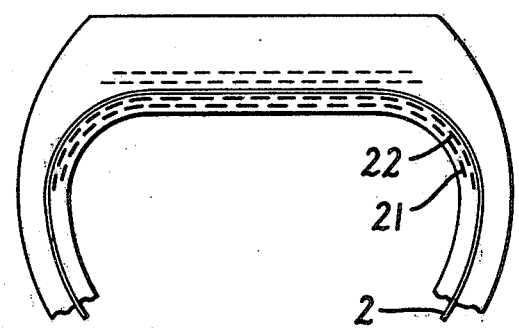
Figure 7:
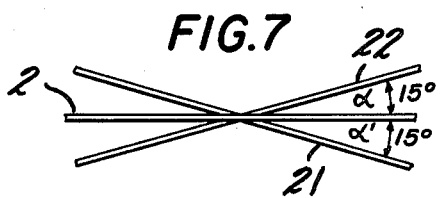
Figure 7A:
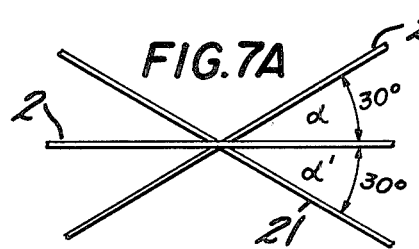
Figure 8:
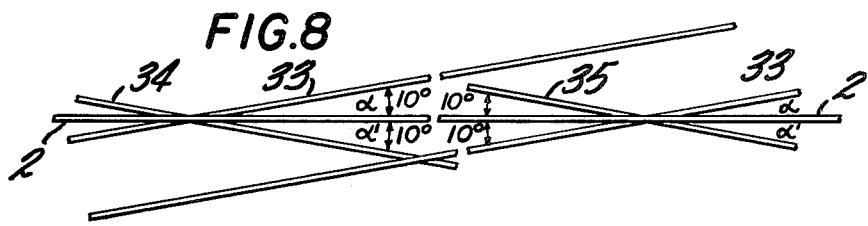

In the embodiment of the invention shown in FIG. 2, the carcass ply 2 is reinforced by two plies 21 and 22 of oblique elastic cords, e.g. of polyamide, whose edges are located beyond the edges of the crown reinforcements. As FIG. 7 shows schematically, the cords of the ply 21 form an angle $\alpha'$ of for example 15° in one direction (e.g., clockwise or to the right) with the cords of the ply 2 while the cords of the ply 22 form an angle $\alpha$ of 15° in the other direction (in this example counterclockwise or to the left). The angles $\alpha$ and $\alpha'$ of FIG. 7 may also be between 6° and 12°, as shown in FIGS. 6 and 8.

Figure 3:
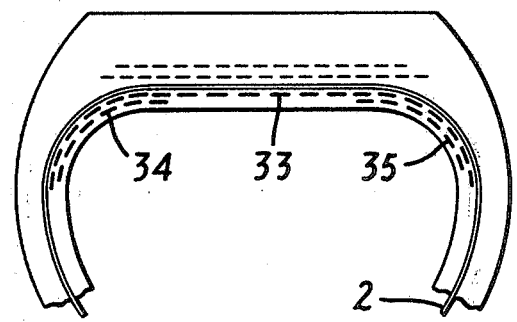
Figure 8A:
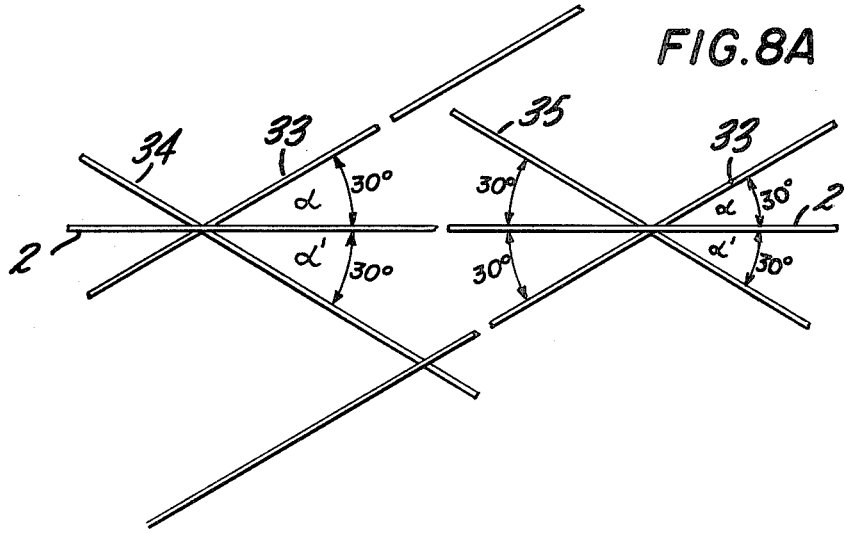

In the embodiment of the invention shown in FIG. 3, the carcass ply 2 is reinforced by an oblique ply of elastic cords 33 similar to the ply 3 of FIG. 1 and by two oblique narrow plies of elastic cords 34 and 35 arranged radially inward of the ply 33, each in the region of a shoulder of the tire as described in U.S. Pat. No. 3,789,900. As FIG. 8 shows, the elastic cords of the ply 33 form an angle $\alpha$ of about 10° in one direction with the cords of the ply 2, while the elastic cables of the plies 34 and 35 form an angle $\alpha'$ of about 10° in the other direction with the cords of the ply 2. As FIG. 8A shows, the angles $\alpha$ and $\alpha'$ of FIG. 7 are at most 30°.

Figure 4:
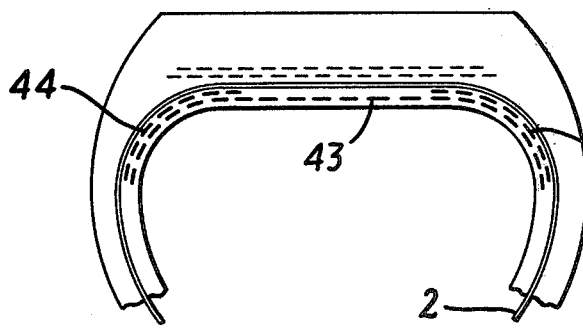

The embodiment of FIG. 4 differs from that of FIG. 3 only in that the narrow plies 44 and 45 are arranged between the carcass ply 2 and the ply of elastic cords 43 provided in accordance with the invention.

Thus there is provided in accordance with the invention a novel and highly-effective pneumatic tire. Many modifications thereof will readily occur to those skilled in the art upon consideration of this disclosure. Accordingly, the invention is to be construed as including all of the structure which is within the scope of the appended claims and equivalents thereof.

I claim:

1. A large, heavy-duty pneumatic tire for construction equipment and the like comprising two beads, a continuous carcass extending from one bead to the other and substantially formed of radial cords, and a tread with a tread reinforcement which is formed by at least two plies of parallel cords in each ply in crosswise superimposed arrangement from one ply to the next one and forming with the longitudinal direction of the tire angles of at most 30°, said tread reinforcement being less wide than the tread and located radially outside said carcass to restrain the latter and having a slightly curved meridian profile, said carcass, under the effect of the restraint by said tread reinforcement, assuming a meridian profile which in the region covered by said tread reinforcement is less curved than the normal equilibrium profile and in the region of the shoulders of the tire is more curved than the normal equilibrium profile, said tire comprising also at least one ply of oblique elastic cords which form angles of at most 30° with the radial cords of the carcass, said ply of oblique elastic cords being arranged radially inward of the carcass, extending continuously in the transverse direction of the tire over a width greater than the maximum width of the tread reinforcement, having its two edges located beyond the edges of said tread reinforcement, producing a complementary attenuation of the restraining force of the crown reinforcement, decreasing the curvature of the carcass reinforcement in the equatorial zone of the tire, and increasing this curvature in the region of the shoulders.

2. A pneumatic tire according to claim 1, further comprising at least one additional ply of oblique elastic cords arranged radially inward of the carcass, extending in the transverse direction of the tire over a width greater than the maximum width of the tread reinforcement, and having its two edges located beyond the edges of said tread reinforcement, the first-named oblique elastic cords forming angles of at most 30° with said cords of the carcass in one direction and the second-named oblique elastic cords forming angles of at most 30° with said cords of the carcass in the other direction.

3. A pneumatic tire according to claim 2, wherein the angles formed by said oblique elastic cords and said cords of the carcass are between 6° and 12°.

4. A pneumatic tire according to claim 1, further comprising two narrow plies of oblique elastic cords, each in the region of a shoulder of the tire, the first-named oblique elastic cords being inclined to one direction with respect to the cords of the carcass and the cords of said narrow plies forming angles of at most 30° in the other direction with said cords of the carcass, said two oblique narrow plies being disposed radially inward of said one ply of oblique elastic cords.

5. A pneumatic tire according to claim 4, wherein the angles formed by said oblique elastic cords and said cords of the carcass are between 6° and 12°.

6. A pneumatic tire according to claim 1, further comprising two narrow plies of oblique elastic cords, each in the region of a shoulder of the. tire, the first-named oblique elastic cords being inclined in one direction with respect to the cords of the carcass and the cords of said narrow plies forming angles of at most 30° in the other direction with said cords of the carcass, said two oblique narrow plies being disposed between said carcass and said one ply of oblique elastic cords.

7. A pneumatic tire according to claim 6, wherein the angles formed by said oblique elastic cords and said cords of the carcass are between 6° and 12°.

8. A pneumatic tire according to claim 1, wherein the angles formed by said oblique elastic cords and said cords of the carcass are between 6° and 12°.

* * * * *